United States Patent
Lin et al.

(10) Patent No.: US 8,442,145 B2
(45) Date of Patent: May 14, 2013

(54) TRANSMITTING TERMINAL AND TRANSMIT ANTENNA SELECTING METHOD THEREOF

(75) Inventors: Pu-Hsuan Lin, Yongkang (TW); Shang-Ho Tsai, Kaohsiung (TW); Yung-Chuan Lin, Yilan (TW); Gene C. H. Chuang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 308 days.

(21) Appl. No.: 12/959,664

(22) Filed: Dec. 3, 2010

(65) Prior Publication Data
US 2012/0140848 A1 Jun. 7, 2012

(51) Int. Cl.
*H04B 7/02* (2006.01)
(52) U.S. Cl.
USPC ......... 375/267; 375/257; 375/260; 375/262; 375/265; 375/340; 375/343; 375/346; 375/350
(58) Field of Classification Search ............... 375/267, 375/296, 260, 262, 265, 340, 343, 346, 347; 370/203, 204, 205, 208, 209, 210
See application file for complete search history.

(56) References Cited

U.S. PATENT DOCUMENTS

| | | | |
|---|---|---|---|
| 7,684,765 B2 | 3/2010 | Song | |
| 7,720,173 B2 | 5/2010 | David et al. | |
| 7,764,931 B2 * | 7/2010 | Kim et al. | 455/69 |
| 8,111,655 B2 * | 2/2012 | Hui | 370/329 |
| 8,204,142 B2 * | 6/2012 | Hwang et al. | 375/267 |
| 2010/0128827 A1 | 5/2010 | Lincoln et al. | |

FOREIGN PATENT DOCUMENTS

TW 200836530 9/2008

OTHER PUBLICATIONS

English language translation of abstract of TW 200836530 (published Sep. 1, 2008).
Chen, R., et al.; "Transmit Selection Diversity for Unitary Precoded Multiuse Spatial Multiplexing Systems with Linear Receivers;" IEEE Trans. Signal Processing; 2005; pp. 1-30.
Sanayei, S., et al; "Antenna Selection in MIMO Systems;" Adaptive Antennas and MIMO Systems for Wireless Communications—IEEE Communications Magazine; Oct. 2004; pp. 68-73.

* cited by examiner

*Primary Examiner* — Dhaval Patel
(74) *Attorney, Agent, or Firm* — McClure, Qualey & Rodack, LLP (57) ABSTRACT

A transmitting terminal includes a signal processing unit, $M_S$ RF units, $M_T$ transmit antennas and a switch unit. The signal processing unit has K precoders for precoding K data streams corresponding to K receiving terminals. The $M_S$ RF units output $M_S$ up-converted transmit signals based on the precoded K data streams. The switch unit is coupled between the RF units and the transmit antennas and controlled by the signal processing unit for selection of the transmit antennas. The signal processing unit sets the $M_T$ transmit antennas as a universal set, calculates a plurality of sum rates corresponding to a plurality of subsets, each subset excluding an $i^{th}$ transmit antenna, according to channel state information, selects the subset with a maximum sum rate as the universal set of a next iteration, and then repeats the calculating and selecting steps until the subset with the maximum sum rate remaining $M_S$ transmit antennas.

21 Claims, 10 Drawing Sheets

TRANSMITTING TERMINAL AND TRANSMIT ANTENNA SELECTING METHOD THEREOF

TECHNICAL FIELD

The invention relates in general to a transmitting terminal and a transmit antenna selecting method thereof.

BACKGROUND

Multi-input multi-output (MIMO) techniques are widely employed in transceivers to achieve high rate transmission in wireless communication system. In the downlink broadcast channels (BCs), the base station simultaneously transmits multiple signals to multiple mobile stations in the same frequency band. In the multi-user system that multiple cells coexist to form a wide coverage network, the desired signal of single user leads to interference to other users, thereby may be seriously degrading system performance. In current WiMAX and LTE standards, femtocells and cooperated macrocells are deployed to reduce transmission power and increase linking quality. However, due to the geographically irregular deployment, the interference arisen from the femtocells is even more serious than the interference arisen from the macrocells. To reduce the interference, multiple interference avoidance techniques are developed to reduce the transmission power and increasing overall capacity. However, the present interference avoidance techniques suffer from high complexity. Therefore, a practical interference avoidance technique with high performance is a major subject in the wireless communication field.

SUMMARY

The invention is directed to a transmitting terminal and a transmit antenna selecting method thereof, capable of achieving interference avoidance of users at receiving terminals by reasonable selecting transmit antenna number of a transmitting terminal, and having advantages with low computation complexity and high performance.

According to a first aspect of the present disclosure, a transmitting terminal is provided. A transmitting terminal includes a signal processing unit, $M_S$ RF units, $M_T$ transmit antennas and a switch unit. The signal processing unit has K precoders for precoding K data streams corresponding to K receiving terminals. The $M_S$ RF units output $M_S$ up-converted transmit signals based on the precoded K data streams. The switch unit is coupled between the RF units and the transmit antennas and controlled by the signal processing unit for selection of the transmit antennas. The signal processing unit sets the $M_T$ transmit antennas as a universal set, calculates a plurality of sum rates corresponding to a plurality of subsets, each subset excluding an $i^{th}$ transmit antenna, according to channel state information, selects the subset with a maximum sum rate as the universal set of a next iteration, and then repeats the calculating and selecting steps until the subset with the maximum sum rate remaining $M_S$ transmit antennas. K, $M_S$, $M_T$ and i are positive integers, $M_T$ is larger than $M_S$, $M_S$ is larger than or equal to K, and i is equal to 1 to the number of the transmit antennas in the universal set.

According to a first aspect of the present disclosure, a transmit antenna selecting method of a transmitting terminal is provided. The transmitting terminal is applied to a multi-user multi-input multi-output (MIMO) system. The transmitting terminal includes a signal processing unit having K precoders, $M_S$ RF units, $M_T$ transmit antennas and a switch unit, the switch unit coupled between the RF units and the transmit antennas and controlled by the signal processing unit for selection of the transmit antennas. K, $M_S$ and $M_T$ are positive integers, $M_T$ is larger than $M_S$, and $M_S$ is larger than or equal to K. The transmit antenna selecting method includes following steps. The K precoders precode K data streams corresponding to K receiving terminals. The $M_S$ RF units output $M_S$ up-converted transmit signals based on the precoded K data streams. The signal processing unit sets the $M_T$ transmit antennas as a universal set, and calculates a plurality of sum rates corresponding to a plurality of subsets, each subset excluding an $i^{th}$ transmit antenna, according to channel state information, i equal to 1 to the number of the transmit antennas in the universal set. The signal processing unit selecting the subset with a maximum sum rate as the universal set of a next iteration, and then repeating the calculating and selecting steps until the subset with the maximum sum rate remaining $M_S$ transmit antennas.

The invention will become apparent from the following detailed description of the preferred but non-limiting embodiments. The following description is made with reference to the accompanying drawings.

DETAILED DESCRIPTION

Figure 1:
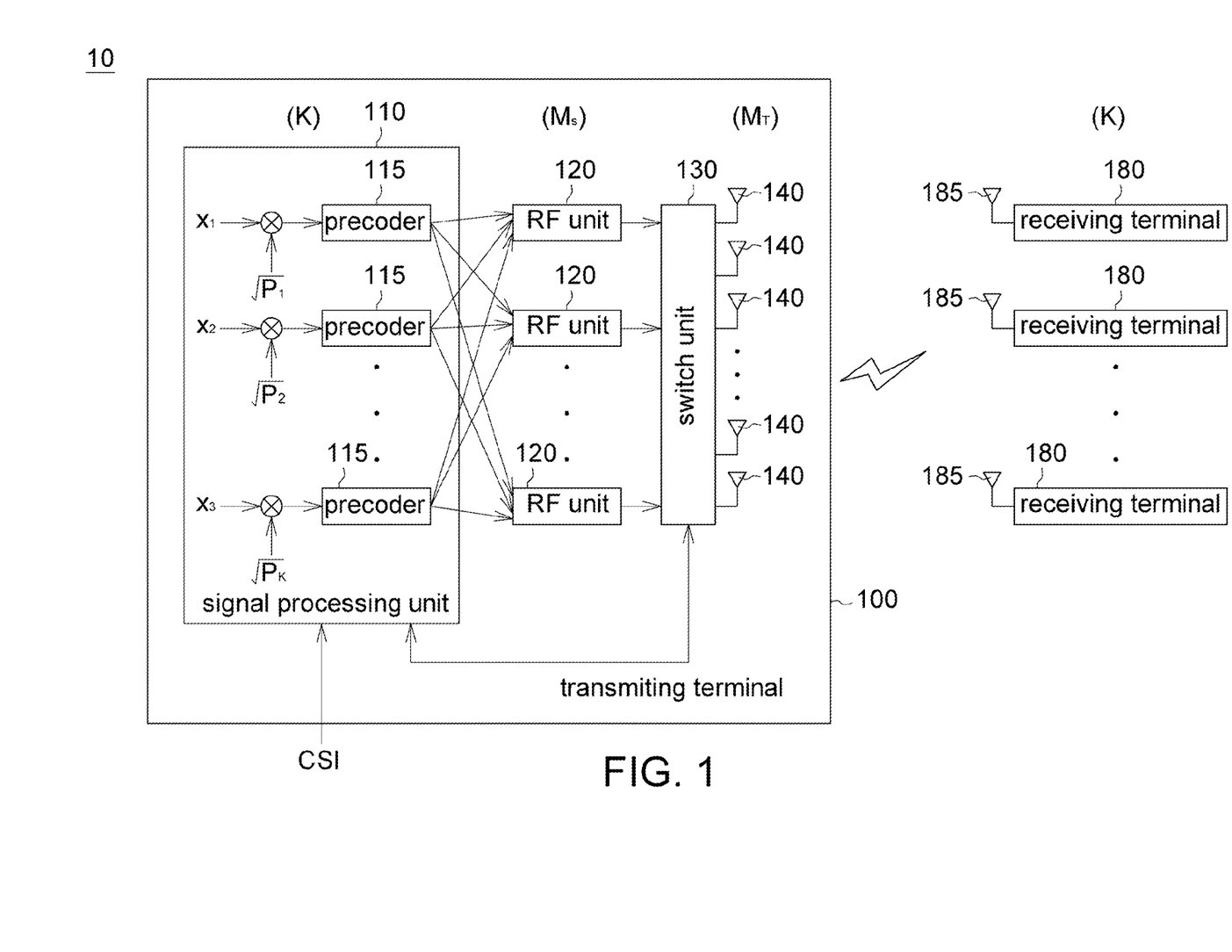
FIG. 1 shows a schematic illustration of a wireless communication system according to an embodiment.

Referring to FIG. 1, a schematic illustration of a wireless communication system according to an embodiment is shown. The wireless communication system 10 is a multi-user multi-input multi-output (MIMO) system and includes a transmitting terminal 100 and multiple receiving terminals 180. For example but is not limited thereto in the embodiment, the transmitting terminal 100 is a base station or a femtocell, and the receiving terminal 180 is a mobile station. Moreover, for simplicity, each receiving terminal 180 is assumed to have only one receive antenna 185, but it is substantially not limited.

The transmitting terminal 100 includes a signal processing unit 110, $M_S$ radio frequency (RF) units 120, a switch unit 130 and $M_T$ transmit antennas 140. The signal processing unit has K precoders 115. The switch unit 130 is coupled between the RF units 120 and the transmit antennas 140, and controlled by the signal processing unit 110 for selection of the transmit antennas 140. K, $M_S$ and $M_T$ are positive integers, $M_T$ is larger than $M_S$, and $M_S$ is larger than or equal to K. In addition, all channels are assumed quasi-static and flat, and channel stat information CSI of the receiving terminals 180 are assumed to be completely feedback to the transmitting terminal 100, thus a total power constraint $P_C$ is known.

Figure 2:
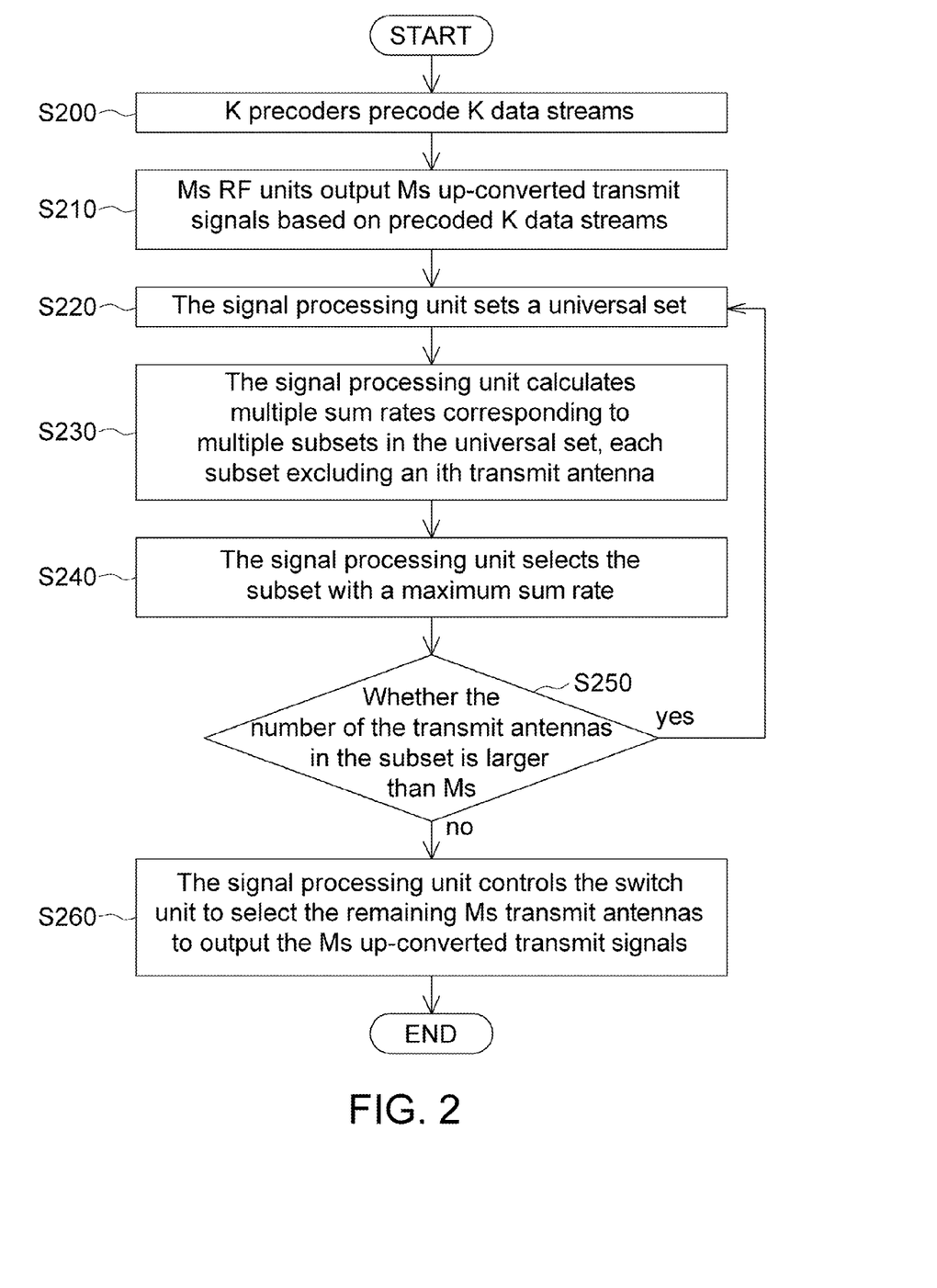
FIG. 2 shows a flow chart of a transmit antenna selecting method of a transmitting terminal according to an embodiment.

Referring to FIG. 2 in cooperation, a flow chart of a transmit antenna selecting method of a transmitting terminal according to an embodiment is shown. Based on the assumption of said single receive antenna, power allocation matrices $P_k$, channel transformation matrices $H_k$ and precoding matrices $W_k$ respectively reduce to power allocation vectors $P_k$, channel transformation vectors $h_k$ and precoding vectors $w_k$, wherein k ranges from 1 to K. In step S200, the K precodes 115 respectively precodes K data streams $x_1$~$x_K$ corresponding to the K receiving terminals 180 according to corresponding precoding matrices $W_1$~$W_K$ and power allocation terms $\sqrt{P_1}$~$\sqrt{P_K}$. In step S210, the $M_S$ RF units 120 output $M_S$ up-converted transmit signals based on the precoded K data streams.

In step S220, the signal processing unit 110 sets the current $M_T$ transmit antennas as a universal set. In step S230, the signal processing unit 110 calculates multiple sum rates corresponding to multiple subsets in the universal set, each subset excluding an $i^{th}$ transmit antenna, according to channel state information CSI, wherein i is equal to 1 to the number of the transmit antennas in the universal set. Let the subset excluding the $i^{th}$ transmit antenna be Si, and the corresponding sum rate be $R_{Si}$. The sum rate $R_{Si}$ of each subset Si can be given by the equation (1).

$$R_{Si} = K \times \log\left(1 + \frac{P_C}{tr(W_{Si}W_{Si}^H)}\right) \quad (1)$$

In step S240, the signal processing unit 110 selects the subset with a maximum sum rate from the subsets Si. In step S250, the signal processing unit 110 determines whether the number of the transmit antennas in the selected subset is larger than $M_S$. If yes, it returns to step S220; that is, the signal processing unit 110 sets the selected subset as the universal set of a next iteration, and then repeats steps S230 and S240, until the subset with the maximum sum rate remaining $M_S$ transmit antennas. Afterwards, proceeding to step S260, the signal processing unit 110 controls the switch unit 130 to select the remaining $M_S$ transmit antennas to output $M_S$ up-converted transmit signals to the receiving terminals 180.

Take the transmitting terminal 100 include 6 RF units 120 and ten transmit antennas 140 as being exemplified. In the first, second and third iterations, the signal processing unit 110 respectively calculates the sum rates of 10, 9 and 8 subsets, and selects the subset having the maximum sum rate with removing the corresponding transmit antenna to proceed to the next iteration. In the forth iteration, the signal processing unit 110 calculates the sum rates of 7 subsets, and selects the subset having the maximum sum rate with removing the corresponding transmit antenna, thereby 6 transmit antennas remained. In the embodiment, compared with the sum rate computing times $C_6^{10}$ under the exhaustive search rule, the signal processing unit 110 applies the greedy search rule, such that the sum rate computing times are only $(C_1^{10}+C_1^9+C_1^8+C_1^7)$, thereby greatly reducing computation complexity.

Furthermore, in each iteration of said embodiment, the operations of the precoding matrices and the sum rates substantially involve matrix inversing and calculation of matrix determinant, which are complicated operations especially when the matrix size is large. Thus, the embodiment further applies a zero-forcing (ZF) precoding technique and a minimum mean square error (MMSE) precoding technique to the precoders to propose equivalent and much simplified proposals.

Figure 3:
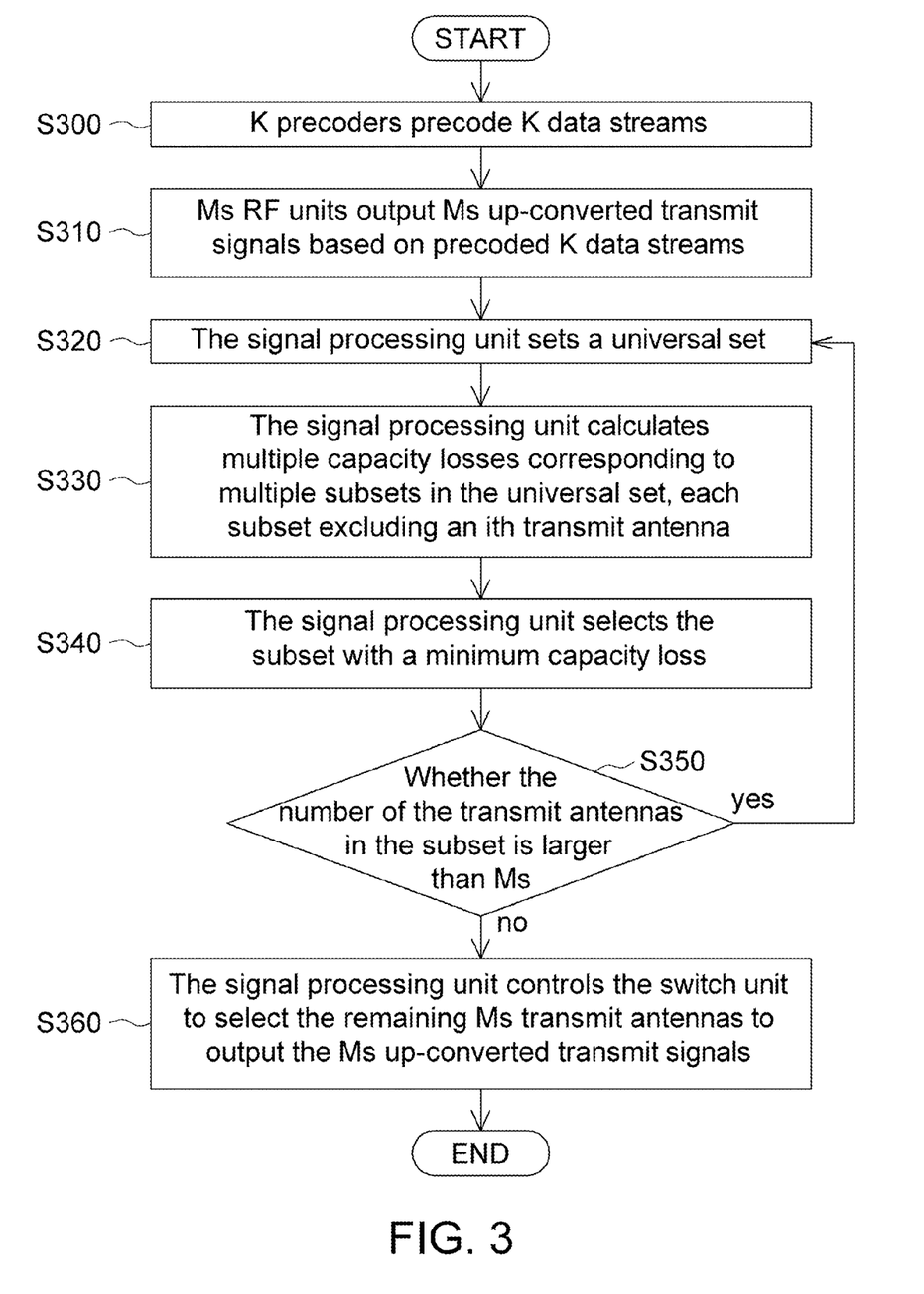
FIG. 3 shows a flow chart of the transmit antenna selecting method applied a zero-forcing precoding technique according to an embodiment.

Referring to FIG. 3, a flow chart of the transmit antenna selecting method applied a zero-forcing precoding technique according to an embodiment is shown. Where the transmit antenna selecting method in FIG. 3 differs with the method in FIG. 2 is steps S300, S330 and S340. In step S300, the K precoders 115 apply the ZF precoding technique. Consequently, due to the interference-free property of the ZF precoding technique enables an interference-free property for all individual users, the wireless communication system 10 can be treated as a point-to-point multi-input single-output system, thus the matrix operations reduce to the summation of all receiving terminals rates.

Besides, in step S330, the signal processing unit 110 regards the transmit antennas 140 in the universal set as equal power allocated instead of conventional water-filling power allocated, hence the sum rate Si can be transformed from the equation (1) to the equation (2).

$$R_{Si} = K \times \log\left(1 + \frac{P_C}{tr((H_{Si}H_{Si}^H)^{-1})}\right) \quad (2)$$

The term $tr((H_{Si}H_{Si}^H)^{-1})$ can be regarded as an equivalent equation of the equation (2) and further be simplified to obtain a capacity loss of the subset, hence the signal processing unit 110 can calculate the capacity losses corresponding to the subsets to replace the calculation of the sum rates. After, in step S340, the signal processing unit 110 selects the subset with the minimum capacity loss.

The calculation of the term $tr((H_{Si}H_{Si}^H)^{-1})$ still needs matrix inversing, so matrix properties and equalities are applied to equate the selecting of the minimum $tr((H_{Si}H_{Si}^H)^{-1})$ and the equations (3a) to (3d), wherein $A_S$ is equal to $(H_SH_S^H)^{-1}$, $H_S$ is a channel transformation matrix of the universal set, and $h_i$ is a column vector corresponding to the $i^{th}$ transmit antenna.

$$\min_i tr((H_{Si}H_{Si}^H)^{-1}) \equiv \min_i tr(H_SH_S^H - h_ih_i^H)^{-1} \quad (3a)$$

$$\equiv \min_i tr\left(A_S + \frac{A_Sh_ih_i^HA_S}{1 - h_i^HAh_i}\right) \quad (3b)$$

$$\equiv \min_i tr\left(\frac{A_Sh_ih_i^HA_S}{1 - h_i^HAh_i}\right) \quad (3c)$$

$$\equiv \min_i \frac{\|h_i^H A_S\|^2}{1 - h_i^H A_S h_i} \quad (3d)$$

Consequently, the signal processing unit 110 calculates $$\frac{\|h_i^H A_S\|^2}{1 - h_i^H A_S h_i}$$

as the capacity loss of each subset, and selects the subset with the minimum capacity loss, thereby greatly reducing computation complexity. In addition, the calculation results of the current iteration can be transferred to the next iteration to obtain $A_S$ of the next iteration easily, hence the overall performance is further improved.

Figure 4:
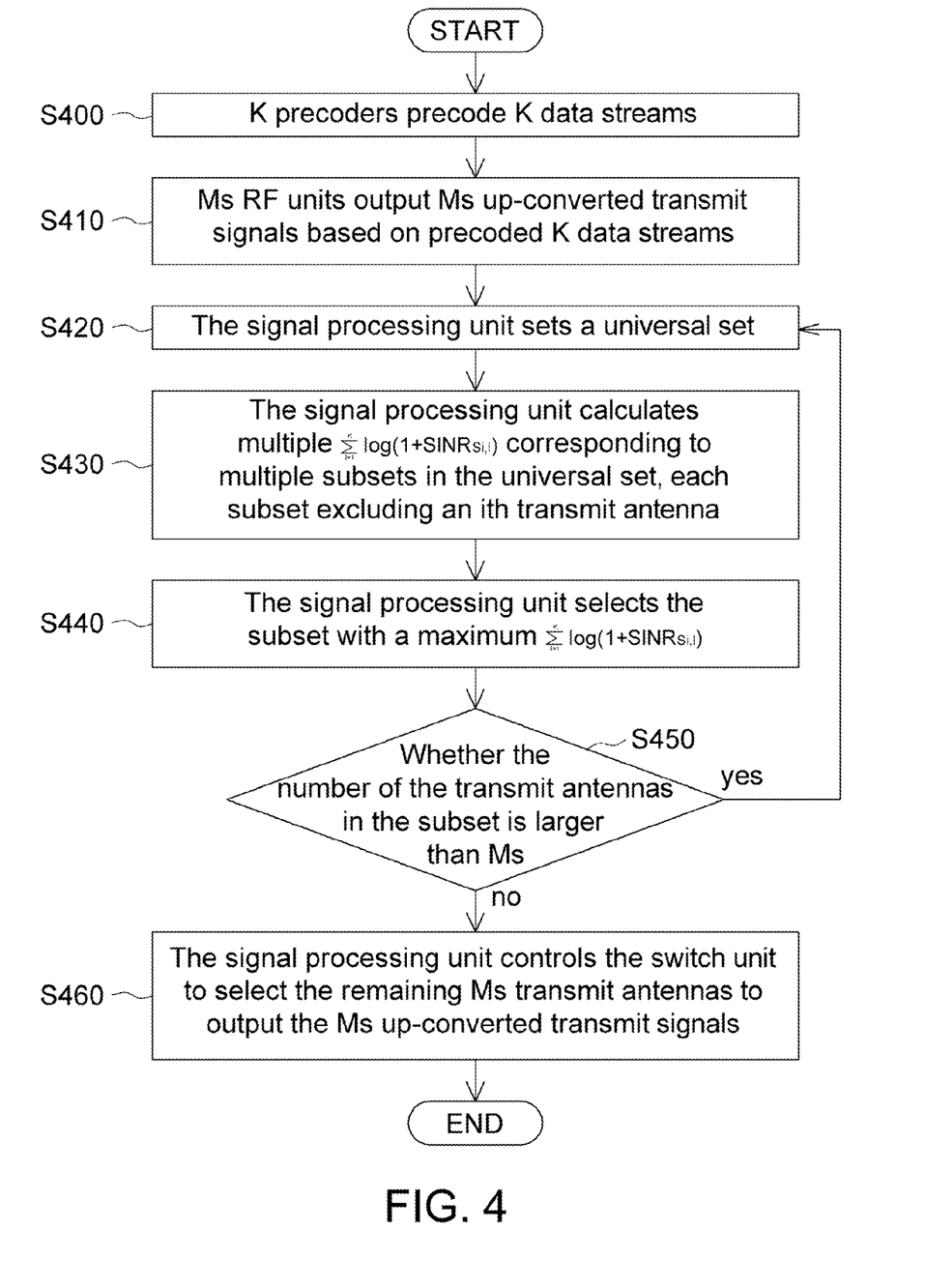
FIG. 4 shows a flow chart of the transmit antenna selecting method applied a minimum mean square error precoding technique according to an embodiment.

Referring to FIG. 4, a flow chart of the transmit antenna selecting method applied a minimum mean square error precoding technique according to an embodiment is shown. Where the transmit antenna selecting method in FIG. 4 differs with the method in FIG. 2 is steps S400, S430 and S440. In step S400, the K precoders 115 apply the MMSE precoding technique.

In step S430, the signal processing unit 110 regards the transmit antennas 140 in the universal set as equal power allocated instead of conventional water-filling power allocated, hence the capacity $R_{MMSE}$ under the MMSE precoding technique and equal power allocation can be obtained referring to the reference "M. Sharif and B. Hassibi, "On the capacity of MIMO broadcast channels with partial side information," IEEE Trans. Information Theory., February 2005.", and is shown as the equation (4). Wherein $SINR_{Si,l}$ represents a signal to interference plus noise ratio (SINR) of an $l^{th}$ receiving terminal corresponding to the subset.

$$R_{MMSE} = \sum_{l=1}^{K} \log(1 + SINR_{Si,l}) \quad (4)$$

Consequently, the signal processing unit 110 calculates $$\sum_{l=1}^{K} \log(1 + SINR_{Si,l})$$

of each subset to replace the calculation of the sum rate of each subset.

After, the signal processing unit 110 selects the subset with the maximum $$\sum_{l=1}^{K} \log(1 + SINR_{Si,l}).$$

In addition, equal power is allocated in the MMSE precoding, hence the power allocation matrices $P_{Si}$ can be determined by the total power constraint $P_C$, as shown in the equations (5a) to (5b). Meanwhile, matrix properties and equalities are applied to obtain the equivalent equations (5c) to (5d) of the equation (5b). Wherein $A'_S$ is equal to $(\alpha I + H_S H_S^H)^{-1}$, $\alpha$ is equal to $$\frac{tr(R_n)}{P_C},$$

$R_n$ is a covariance matrix, $H_S$ is a channel transformation matrix of the universal set, and $h_i$ is a column vector corresponding to the $i^{th}$ transmit antenna.

$$P_{Si} = \sqrt{\beta_{MMSE}} = \frac{P_C}{tr((T_{Si}^{-1} H_{Si}^H)(T_{Si}^{-1} H_{Si}^H)^H)} \quad (5a)$$

$$\text{wherein } T_{Si} = H_{Si}^H H_{Si} + \frac{tr(R_n)}{P_C} \cdot I \quad (5b)$$

$$(T_{Si})^{-1} = (H_{Si}^H H_{Si} + \alpha I)^{-1} \quad (5c)$$
$$= \frac{I}{\alpha} + \frac{1}{\alpha} H_{Si}^H (\alpha I + H_{Si} H_{Si}^H)^{-1} H_{Si}$$

$$(\alpha I + H_{Si} H_{Si}^H)^{-1} = (\alpha I + H_S H_S^H - h_i h_i^H)^{-1} \quad (5d)$$
$$= A'_S + \frac{A_S h_i h_i^H A_S}{1 - h_i^H A'_S h_i}$$

It can be observed from the equations (5a) to (5d), the calculation results of the current iteration in FIG. 4 can be transferred to the next iteration; hence the computation complexity is reduced and the overall performance is improved.

Figure 5:
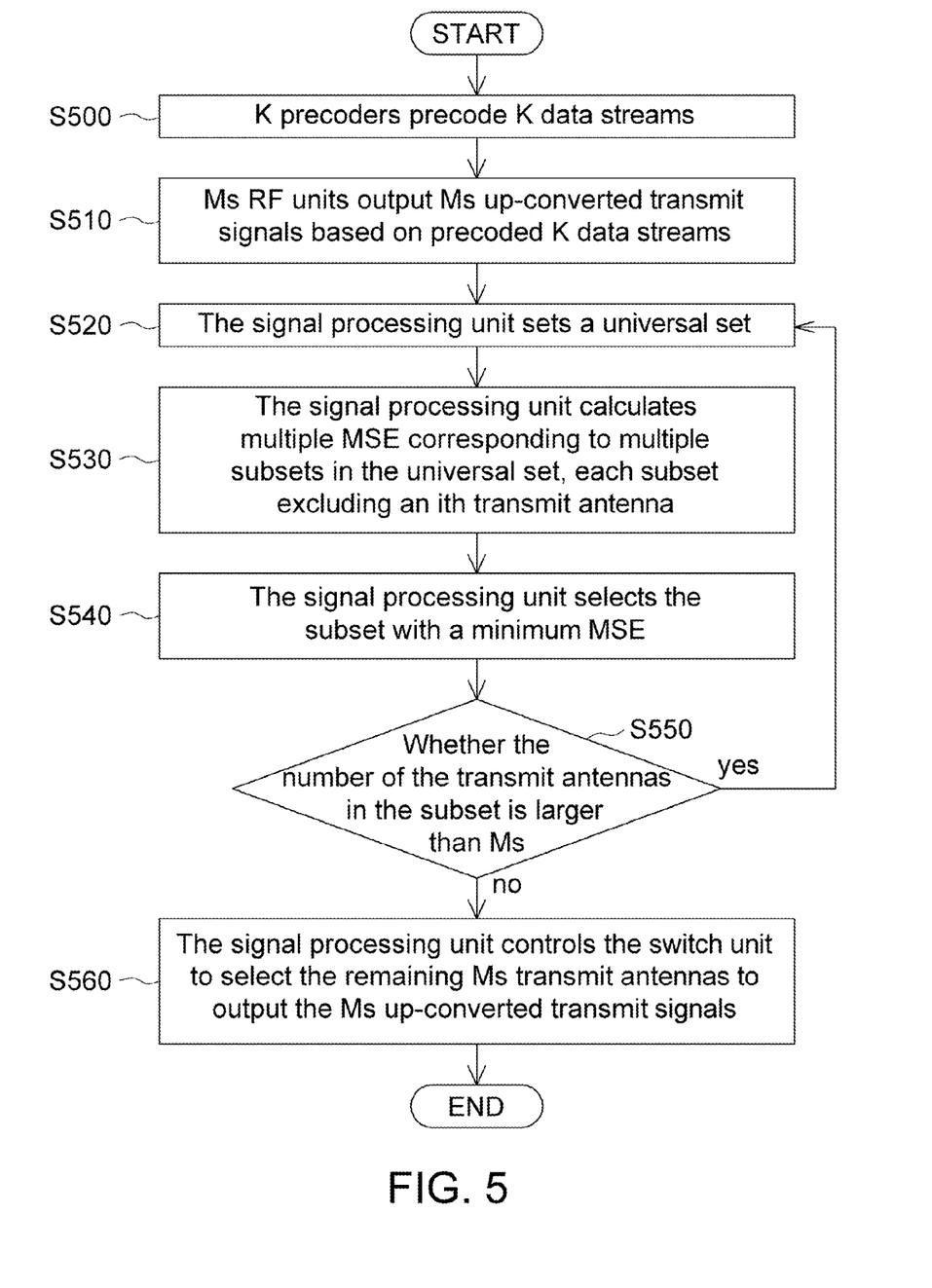
FIG. 5 shows a flow chart of the transmit antenna selecting method applied the minimum mean square error precoding technique according to another embodiment.

In addition, in the MMSE precoding, mean square error (MSE) $\delta_{Si}$ is equal to $tr((\alpha I + H_{Si} H_{Si}^H)^{-1})$. Therefore, it can calculate MSE corresponding to the subsets to replace the calculation of the sum rates. Referring to FIG. 5, a flow chart of the transmit antenna selecting method applied the minimum mean square error precoding technique according to another embodiment is shown. Where the transmit antenna selecting method in FIG. 5 differs with the method in FIG. 4 is steps S530 and S540. In step S530, the signal processing unit 110 calculates MSE corresponding to the subsets to replace the calculation of the sum rates. After, in step S540, the signal processing unit 110 selects the subset with the minimum MSE.

In addition, based on equal power allocation and matrix properties and equalities, the selecting of the minimum MSE and the equations (6a) to (6e) are equated, $A'_S$ is equal to $(\alpha I + H_S H_S^H)^{-1}$, $\alpha$ is equal to $$\frac{tr(R_n)}{P_C},$$

$R_n$ is a covariance matrix, $H_S$ is a channel transformation matrix of the universal set, $H_i$ is a channel transformation matrix corresponding to the $i^{th}$ transmit antenna, and $h_i$ is a column vector corresponding to the $i^{th}$ transmit antenna.

$$\min_i \delta_{Si} = \min_i tr\left((\alpha I + H_{Si} H_{Si}^H)^{-1}\right) \quad (6a)$$

$$= \min_i tr(\alpha I + H_S H_S^H - h_i h_i^H)^{-1} \quad (6b)$$

$$\equiv \min_i tr\left(A'_S h_i (I - h_i^H A'_S h_i)^{-1} h_i^H A'_S\right) \quad (6c)$$

-continued $$\equiv \min_i \frac{tr(A'_S h_i h_i^H A'_S)}{1 - h_i^H A'_S h_i} \quad (6d)$$

$$\equiv \min_i \frac{\|A'_S h_i\|^2}{1 - h_i^H A'_S h_i} \quad (6e)$$

Therefore, the signal processing unit 110 calculates $$\frac{\|A'_S h_i\|^2}{1 - h_i^H A'_S h_i}$$

as the MSE of each subset, and the computation complexity is greatly reduced. In addition, it can be observed from the equations (6a) to (6e), the calculation results of the current iteration in FIG. 5 can be transferred to the next iteration to obtain $A'_S$ of the next iteration, thereby further improving the overall performance.

Figure 6:
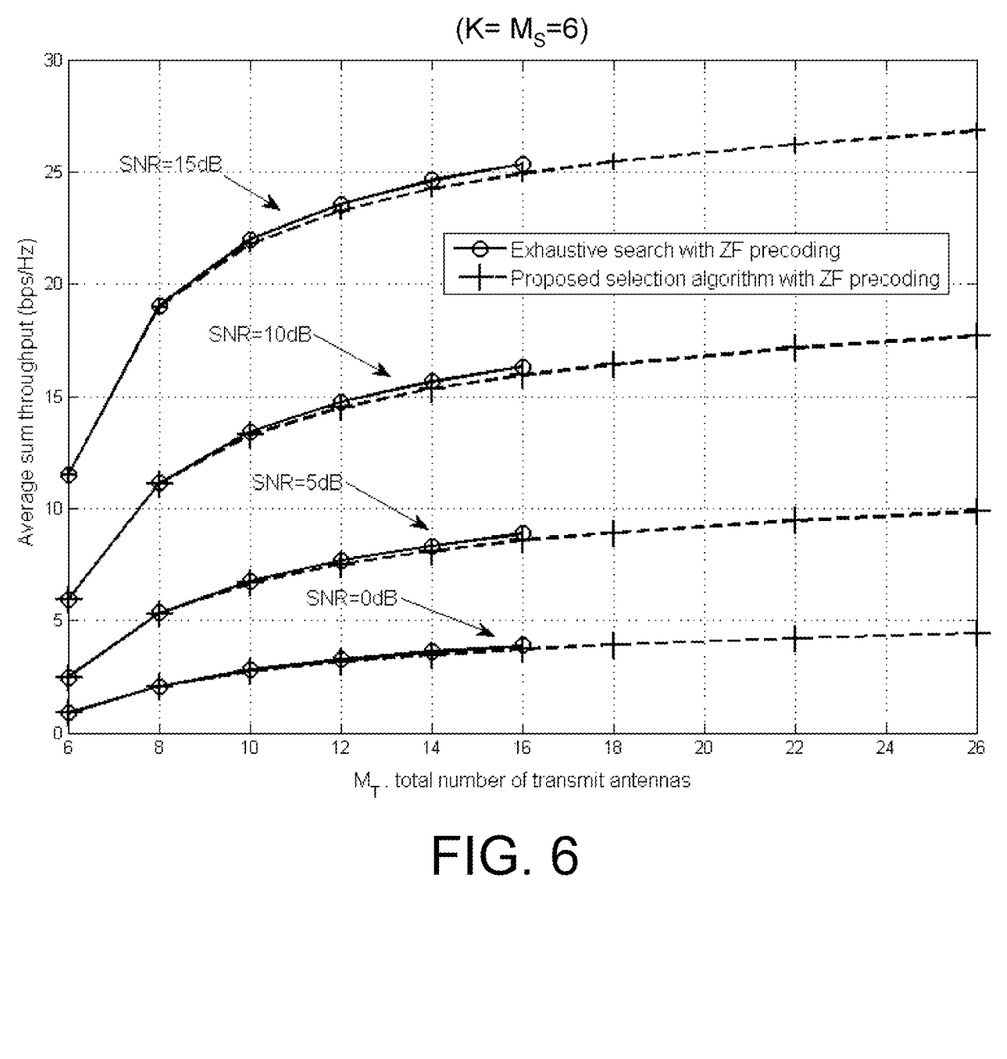
FIG. 6 shows a schematic illustration of average sum throughput of the transmit antenna selecting method applied the zero-forcing precoding technique according to an embodiment and average sum throughput of the traditional exhaustive search method applied the zero-forcing precoding technique.
Figure 7:
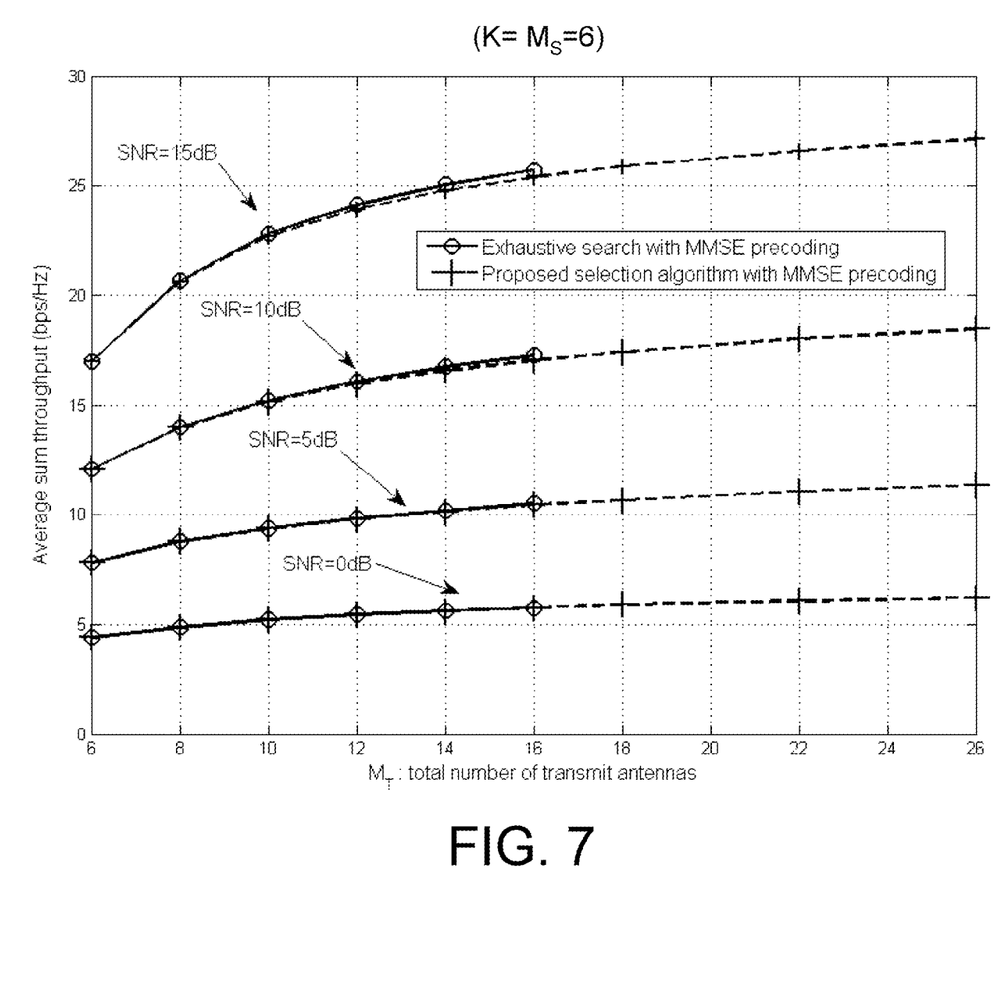
FIG. 7 shows a schematic illustration of average sum throughput of the transmit antenna selecting method applied the minimum mean square error precoding technique according to an embodiment and average sum throughput of the traditional exhaustive search method applied the minimum mean square error precoding technique.

Referring to FIGS. 6 and 7, FIG. 6 shows a schematic illustration of average sum throughput of the transmit antenna selecting method applied the zero-forcing precoding technique according to an embodiment and average sum throughput of the traditional exhaustive search method applied the zero-forcing precoding technique, and FIG. 7 shows a schematic illustration of average sum throughput of the transmit antenna selecting method applied the minimum mean square error precoding technique according to an embodiment and average sum throughput of the traditional exhaustive search method applied the minimum mean square error precoding technique. It can be observed in FIGS. 6 and 7 that the average sum throughput of the transmit antenna selecting method of the embodiment with greatly-reduced complexity is very close to the average sum throughput of the exhaustive search method.

Figure 8:
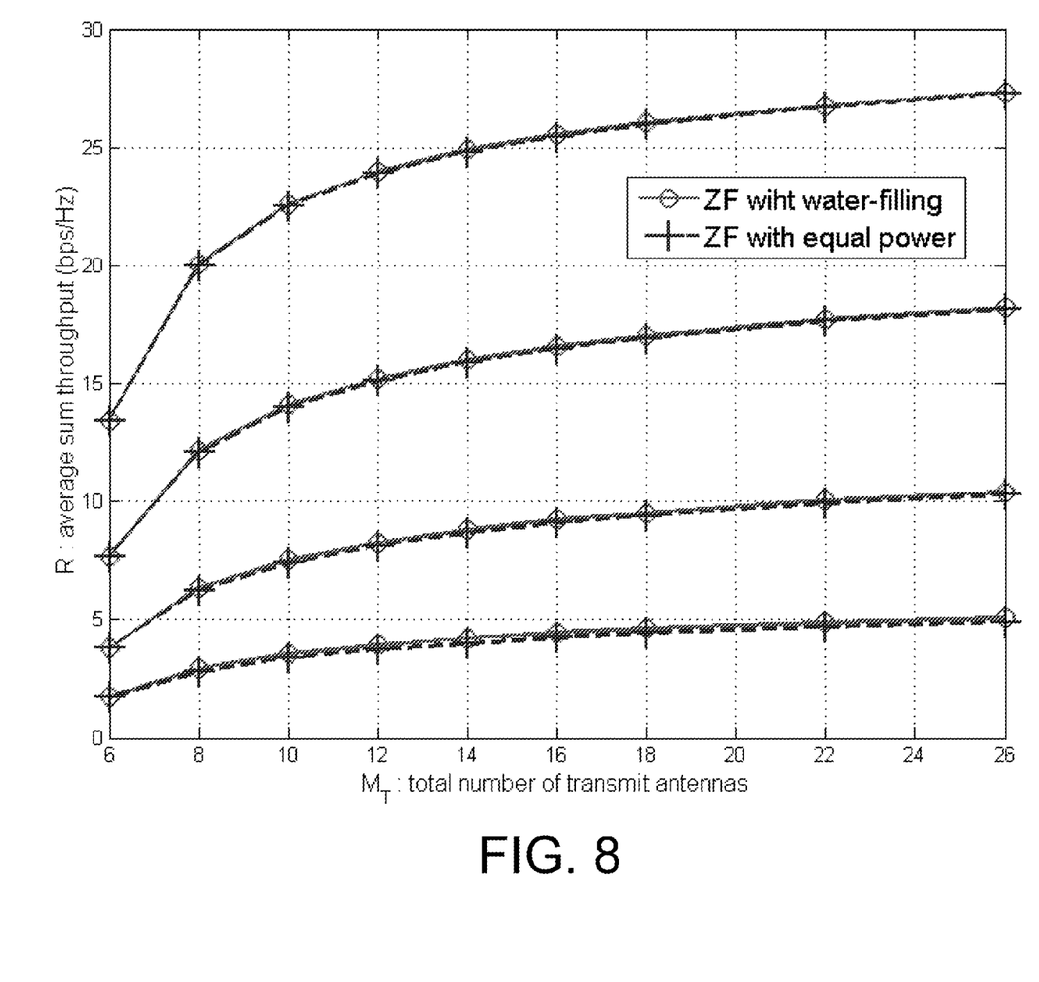
FIG. 8 shows a schematic illustration of average sum throughput of the transmit antenna selecting method applied the zero-forcing precoding technique and different power allocations according to an embodiment.
Figure 9:
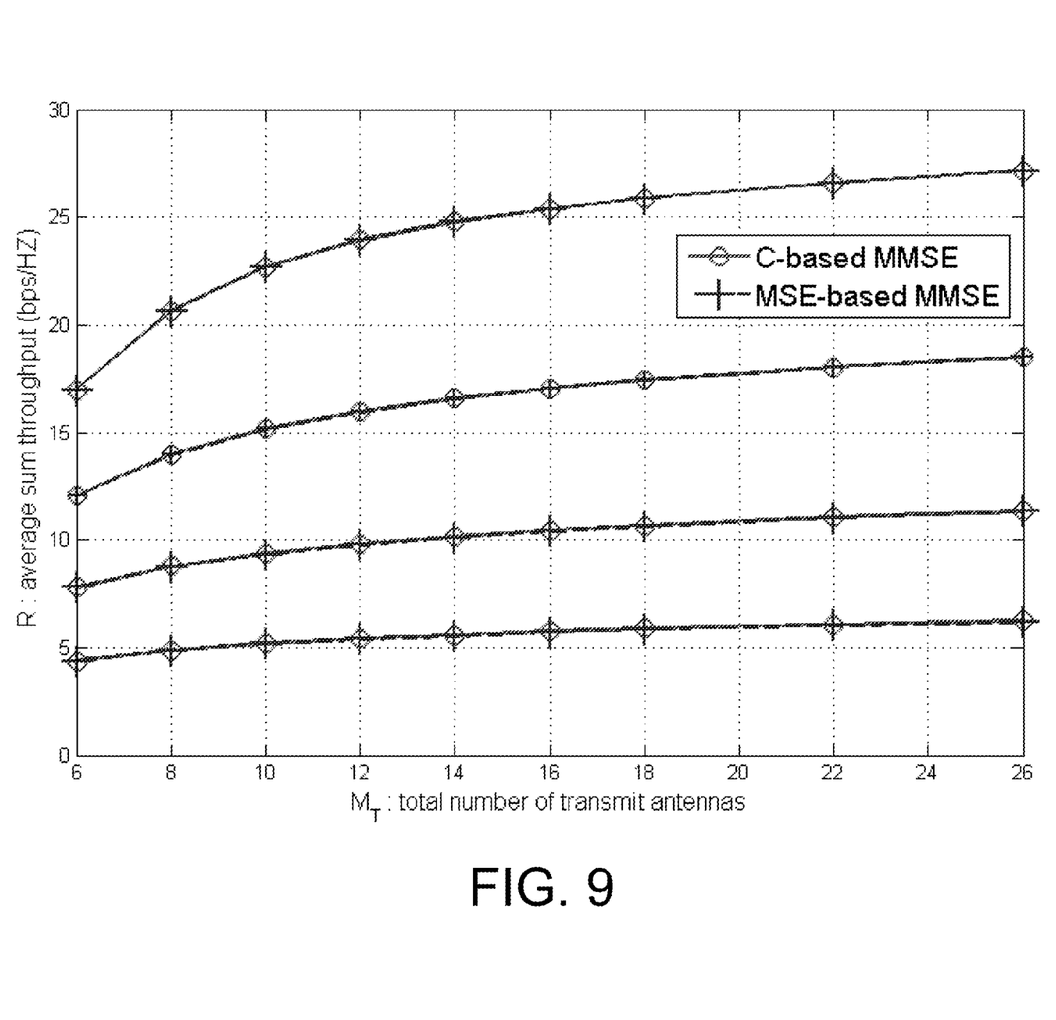
FIG. 9 shows a schematic illustration of average sum throughput of the transmit antenna selecting method applied the minimum mean square error precoding technique according to an embodiment.

Referring to FIG. 8, a schematic illustration of average sum throughput of the transmit antenna selecting method applied the zero-forcing precoding technique and different power allocations according to an embodiment is shown. It can be observed in FIG. 8 that based on the zero-forcing precoding technique, the average sum throughput of the transmit antenna selecting method with equal power allocation is very close to the average sum throughput of traditional method with water-filling allocation, thus the performance is hardly loss and the computation complexity is greatly reduced. Referring to FIG. 9, a schematic illustration of average sum throughput of the transmit antenna selecting method applied the minimum mean square error precoding technique according to an embodiment is shown. It can be observed in FIG. 9 that the MMSE precoding techniques with equal power allocation corresponding to FIGS. 4 and 5 do not lose performance, and is able to greatly reduce the computation complexity.

Figure 10:
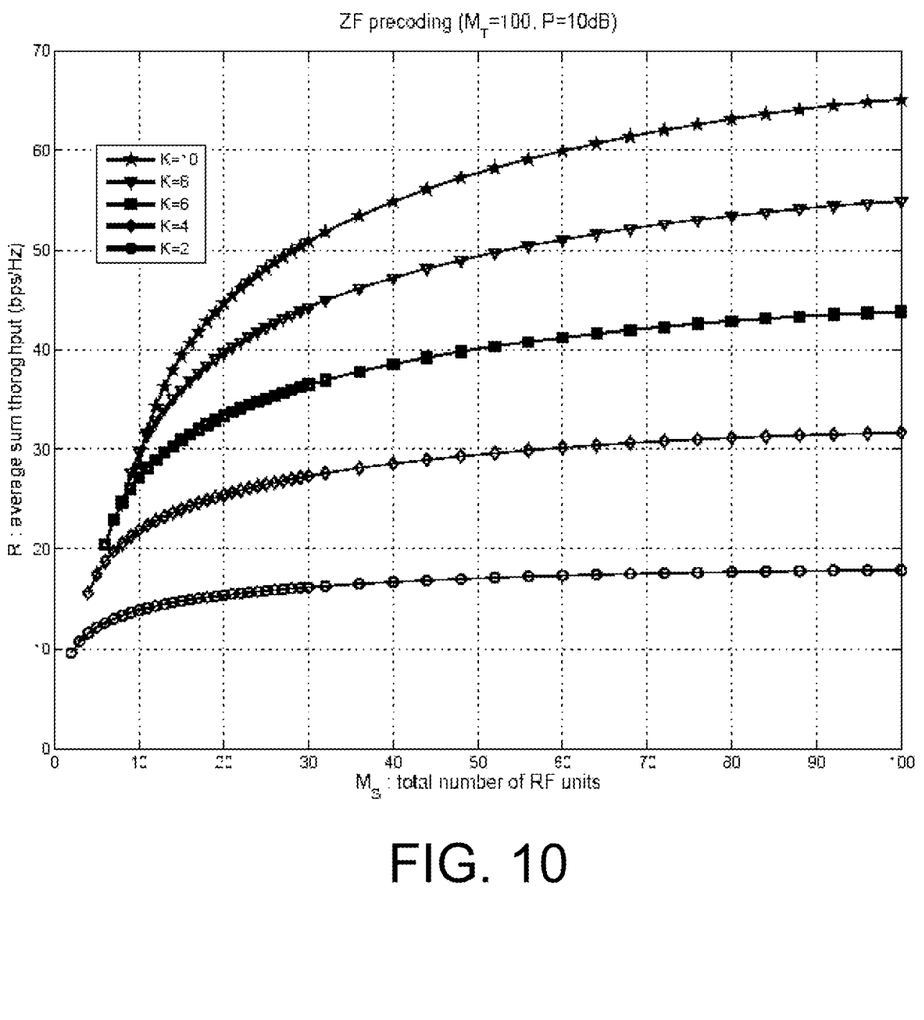
FIG. 10 shows a schematic illustration of average sum throughput of the transmit antenna selecting method with different quantities of RF units according to an embodiment.

Moreover, referring to FIG. 10, a schematic illustration of average sum throughput of the transmit antenna selecting method with different quantities of RF units according to an embodiment is shown. It can be observed in FIG. 10, the sum average throughput is approached a limit value as the quantity of the RF units increases. By employing the transmit antenna selecting method of the embodiment, the wireless communication system can make the transmitting terminal equip with less RF units to meet an acceptable performance target by fixed numbers of the receiving terminals K and the transmit antennas $M_T$, thereby reducing the cost due to the reduction of the expensive analog component RF units.

The transmitting terminal and the transmit antenna selecting method thereof according to the embodiment have many advantages, some of which will be listed and described in the following.

The transmitting terminal and the transmit antenna selecting method thereof according to the embodiment abandon the exhaustive search rule and switch to apply the greedy search rule to reasonably select transmit antenna number of the transmitting terminal, and further apply the ZF precoding technique and the MMSE precoding technique with equal power allocation, thereby achieving interference avoidance of users at receiving terminals, and greatly reducing the computation complexity and simultaneously keeping high performance of the overall system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transmitting terminal, comprising:

a signal processing unit, having K precoders, for precoding K data streams corresponding to K receiving terminals;

$M_S$ radio frequency (RF) circuits for outputting $M_S$ up-converted transmit signals based on the precoded K data streams;

$M_T$ transmit antennas; and a switch unit, coupled between the RF units and the transmit antennas, controlled by the signal processing unit for selection of the transmit antennas;

wherein the signal processing unit sets the $M_T$ transmit antennas as a universal set, calculates a plurality of sum rates corresponding to a plurality of subsets, each subset excluding an $i^{th}$ transmit antenna, according to channel state information, selects the subset with a maximum sum rate as the universal set of a next iteration, and then repeats the calculating and selecting steps until the subset with the maximum sum rate remaining $M_S$ transmit antennas;

wherein K, $M_S$, $M_T$ and i are integers, $M_T$ is larger than $M_S$, $M_S$ is larger than or equal to K, and i is equal to 1 to the number of the transmit antennas in the universal set;

the signal processing unit regards the transmit antennas in the universal set as being equal power allocated, calculates a plurality of capacity losses corresponding to the subsets to replace the calculation of the sum rates, selects the subset with a minimum capacity loss as the universal set of the next iteration, and then repeats the calculating and selecting steps until the subset with the minimum capacity loss remaining $M_S$ transmit antennas.

2. The transmitting terminal according to claim 1, wherein the signal processor controls the switch unit to select the remaining $M_S$ transmit antennas to output the $M_S$ up-converted transmit signals.

3. The transmitting terminal according to claim 1, wherein the K precoders are K zero-forcing (ZF) precoders.

4. The transmitting terminal according to claim 1, wherein the signal processing unit calculates $$\frac{\|h_i^H A_S\|^2}{1 - h_i^H A_S h_i}$$

as the capacity loss of each subset, $A_S$ is equal to $(H_S H_S^H)^{-1}$, $H_S$ is a channel transformation matrix of the universal set, and $h_i$ is a column vector corresponding to the $i^{th}$ transmit antenna.

5. The transmitting terminal according to claim 1, wherein the transmitting terminal is a base station.

6. The transmitting terminal according to claim 1, wherein the transmitting terminal is a femtocell.

7. A transmit antenna selecting method of a transmitting terminal, the transmitting terminal applied to a multi-user multi-input multi-output (MIMO) system, the transmitting terminal comprising a signal processing unit having K precoders, Ms radio frequency (RF) units, $M_T$ transmit antennas and a switch unit, the switch unit coupled between the RF units and the transmit antennas and controlled by the signal processing unit for selection of the transmit antennas, K, Ms and MT being integers, MT larger than Ms, Ms larger than or equal to K, the transmit antenna selecting method comprising:

precoding K data streams corresponding to K receiving terminals by the K precoders;

outputting Ms up-converted transmit signals based on the precoded K data streams by the Ms RF units;

setting the $M_T$ transmit antennas as a universal set, and calculating a plurality of sum rates corresponding to a plurality of subsets, each subset excluding an i th transmit antenna, according to channel state information, i equal to 1 to the number of the transmit antennas in the universal set by the signal processing unit; and selecting the subset with a maximum sum rate as the universal set of a next iteration, and then repeating the calculating and selecting steps until the subset with the maximum sum rate remaining Ms transmit antennas by the signal processing unit;

wherein:

the transmit antennas in the universal set as being equal power allocated, and calculating a plurality of capacity losses corresponding to replace the calculating of the sum rates; and selecting the subset with a minimum capacity loss as the universal set of the next iteration, and then repeating the calculating and selecting steps until the subset with the minimum capacity loss remaining Ms transmit antennas.

8. The transmit antenna selecting method according to claim 7, further comprising:

controlling the switch unit to select the remaining Ms transmit antennas to output the Ms up-converted transmit signals.

9. The transmit antenna selecting method according to claim 7, wherein apply zero-forcing (ZF) precoding technique to precode the K data streams.

10. The transmit antenna selecting method according to claim 7, further comprising:

calculating $$\frac{\|h_i^H A_S\|^2}{1 - h_i^H A_S h_i}$$

as the capacity loss of each subset, $A_S$ equal to $(H_S H_S^H)^{-1}$, $H_S$ being a channel transformation matrix of the universal set, and $h_i$ being a column vector corresponding to the $i^{th}$ transmit antenna.

11. A transmitting terminal, comprising:

a signal processing unit, having K precoders, for precoding K data streams corresponding to K receiving terminals;

$M_S$ radio frequency (RF) circuits for outputting $M_S$ up-converted transmit signals based on the precoded K data streams;

$M_T$ transmit antennas; and a switch unit, coupled between the RF units and the transmit antennas, controlled by the signal processing unit for selection of the transmit antennas;

wherein the signal processing unit sets the $M_T$ transmit antennas as a universal set, calculates a plurality of sum rates corresponding to a plurality of subsets, each subset excluding an $i^{th}$ transmit antenna, according to channel state information, selects the subset with a maximum sum rate as the universal set of a next iteration, and then repeats the calculating and selecting steps until the subset with the maximum sum rate remaining $M_S$ transmit antennas;

wherein K, $M_S$, $M_T$ and i are integers, $M_T$ is larger than $M_S$, $M_S$ is larger than or equal to K, and i is equal to 1 to the number of the transmit antennas in the universal set; and wherein the signal processing unit regards the transmit antennas in the universal set as being equal power allocated, calculates $$\sum_{l=1}^{K} \log(1 + SINR_{Si,l})$$

of each subset to replace the calculation of the sum rates, selects the subset with a maximum $$\sum_{l=1}^{K} \log(1 + SINR_{Si,l})$$

as the universal set of the next iteration, and then repeats the calculating and selecting steps until the subset with the maximum $$\sum_{l=1}^{K} \log(1 + SINR_{Si,l})$$

remaining $M_S$ transmit antennas, $SINR_{Si,l}$ being a signal to interference and noise ratio of an $l^{th}$ receiving terminal corresponding to the subset.

12. The transmitting terminal according to claim 11, wherein the signal processor controls the switch unit to select the remaining $M_S$ transmit antennas to output the $M_S$ up-converted transmit signals.

13. The transmitting terminal according to claim 11, wherein the K precoders are K minimum mean square error (MMSE) precoders.

14. The transmitting terminal according to claim 13, wherein the signal processing unit regards the transmit antennas in the universal set as being equal power allocated, calculates a plurality of mean square errors (MSEs) to replace the calculation of the sum rates, selects the subset with a minimum MSE as the universal set of the next iteration, and then repeats the calculating and selecting steps until the subset with the minimum MSE remaining $M_S$ transmit antennas.

15. The transmitting terminal according to claim 14, wherein the signal processing unit calculates $$\frac{\|A'_S h_i\|^2}{1 - h_i^H A'_S h_i}$$

as the MSE of each subset, $A'_S$ is equal to $(\alpha I + H_S H_S^H)^{-1}$, $\alpha$ is equal to $$\frac{tr(R_n)}{P_C},$$

$P_C$ is a total power constraint, $R_n$ is a covariance matrix, $H_S$ is a channel transformation matrix of the universal set, and $h_i$ is a column vector corresponding to the $i^{th}$ transmit antenna.

16. The transmitting terminal according to claim 11, wherein the transmitting terminal is a base station or a femtocell.

17. A transmit antenna selecting method of a transmitting terminal, the transmitting terminal applied to a multi-user multi-input multi-output (MIMO) system, the transmitting terminal comprising a signal processing unit having K precoders, Ms radio frequency (RF) units, $M_T$ transmit antennas and a switch unit, the switch unit coupled between the RF units and the transmit antennas and controlled by the signal processing unit for selection of the transmit antennas, K, Ms and MT being integers, MT larger than Ms, $M_S$ larger than or equal to K, the transmit antenna selecting method comprising:

precoding K data streams corresponding to K receiving terminals by the K precoders;

outputting Ms up-converted transmit signals based on the precoded K data streams by the Ms RF units;

setting the $M_T$ transmit antennas as a universal set, and calculating a plurality of sum rates corresponding to a plurality of subsets, each subset excluding an i th transmit antenna, according to channel state information, i equal to 1 to the number of the transmit antennas in the universal set by the signal processing unit; and selecting the subset with a maximum sum rate as the universal set of a next iteration, and then repeating the calculating and selecting steps until the subset with the maximum sum rate remaining Ms transmit antennas by the signal processing unit;

wherein:

the transmit antennas in the universal set as being equal power allocated, and calculating $$\sum_{l=1}^{K} \log(1 + SINR_{Si,l})$$

of each subset to replace the calculation of the sum rates; and the signal processing unit selecting the subset with a maximum $$\sum_{l=1}^{K} \log(1 + SINR_{Si,l})$$

as the universal set of the next iteration, and then repeating the calculating and selecting steps until the subset with the maximum $$\sum_{l=1}^{K} \log(1 + SINR_{Si,l})$$

remaining Ms transmit antennas, $SINR_{Si,j}$ being a signal to interference and noise ratio of an $I^{th}$ receiving terminal corresponding to the subset.

18. The transmit antenna selecting method according to claim 17, further comprising:

controlling the switch unit to select the remaining Ms transmit antennas to output the Ms up-converted transmit signals.

19. The transmit antenna selecting method according to claim 17, wherein apply a minimum mean square error (MMSE) precoding technique to precode the K data streams.

20. The transmit antenna selecting method according to claim 17, wherein: the the transmit antennas in the universal set as being equal power allocated, and calculating a plurality of mean square errors (MSEs) to replace the calculation of the sum rates; and selecting the subset with a minimum MSE as the universal set of the next iteration, and then repeats the calculating and selecting steps until the subset with the minimum MSE remaining Ms transmit antennas.

21. The transmit antenna selecting method according to claim 20, further comprising:

calculating $$\frac{\|A'_S h_i\|^2}{1 - h_i^H A'_S h_i}$$

as the MSE of each subset, $A'_S$ equal to $(\alpha I + H_S H_S^H)^{-1}$, $\alpha$ equal to $$\frac{tr(R_n)}{P_C},$$

$P_C$ being a total power constraint, $R_n$ being a covariance matrix, $H_S$ being a channel transformation matrix of the universal set, and $h_i$ being a column vector corresponding to the $i^{th}$ transmit antenna.

* * * * *